(12) United States Patent
Liu

(10) Patent No.: US 10,487,923 B2
(45) Date of Patent: Nov. 26, 2019

(54) MULTI-BAR LINKAGE MECHANISM

(71) Applicant: Whippany Actuation Systems LLC, Whippany, NJ (US)

(72) Inventor: Shijie Liu, Morris Plains, NJ (US)

(73) Assignee: Whippany Actuation Systems LLC, Whippany, NJ (US)

( * ) Notice: Subject to any disclaimer, the term of this patent is extended or adjusted under 35 U.S.C. 154(b) by 2 days.

(21) Appl. No.: 15/704,557

(22) Filed: Sep. 14, 2017

(65) Prior Publication Data

US 2019/0078669 A1    Mar. 14, 2019

(51) Int. Cl.
*F16H 21/12* (2006.01)
*B63H 25/20* (2006.01)
*B64C 13/30* (2006.01)

(52) U.S. Cl.
CPC ............. *F16H 21/12* (2013.01); *B63H 25/20* (2013.01); *B64C 13/30* (2013.01)

(58) Field of Classification Search
CPC .......... F16H 21/12; F16H 21/48; F16H 21/50; B63H 25/20; B64C 13/30
See application file for complete search history.

(56) References Cited

U.S. PATENT DOCUMENTS

| | | | | |
|---|---|---|---|---|
| 3,034,760 A | * | 5/1962 | Henrion | F02D 9/1015 251/173 |
| 3,339,416 A | * | 9/1967 | Diehl | G01L 7/04 73/736 |
| 3,353,277 A | * | 11/1967 | Johnson | G01B 5/204 116/202 |
| 4,050,670 A | * | 9/1977 | Borg | F16K 31/145 251/14 |
| 4,261,546 A | * | 4/1981 | Cory | F16K 31/1655 251/229 |
| 4,688,758 A | * | 8/1987 | Crosby, Jr. | B64B 1/64 251/129.05 |
| 5,048,552 A | * | 9/1991 | Bourne | F16K 17/363 137/39 |
| 5,680,674 A | * | 10/1997 | Guthrie | E05F 3/106 16/53 |
| 5,924,331 A | * | 7/1999 | Pohling | B64C 13/30 244/232 |
| 5,975,487 A | * | 11/1999 | Eggleston | F16K 31/521 160/168.1 R |
| 5,979,864 A | * | 11/1999 | Eggleston | F15B 15/10 251/58 |
| 8,376,311 B2 | * | 2/2013 | Marshall | F16K 1/221 251/278 |
| 9,383,182 B2 | * | 7/2016 | Zhang | G01B 5/14 |
| 2013/0261852 A1 | * | 10/2013 | Recksiek | B64C 13/24 701/3 |
| 2015/0081102 A1 | * | 3/2015 | Kopp | B64C 13/30 700/275 |
| 2017/0320566 A1 | * | 11/2017 | Gemilang | B64C 9/26 |

* cited by examiner

*Primary Examiner* — Zakaria Elahmadi
(74) *Attorney, Agent, or Firm* — BakerHostetler

(57) ABSTRACT

Systems provide and methods utilize a multi-bar linkage in conjunction with an actuator to provide mechanical advantage which increases as a control surface moves towards the extremes of its operating envelope.

19 Claims, 4 Drawing Sheets

MULTI-BAR LINKAGE MECHANISM

TECHNICAL FIELD

The disclosure relates to actuators. More particularly, the disclosure relates to actuators used in conjunction with a multi-bar linkage mechanism.

BACKGROUND

A variety of actuators are available to move various components. For example, moving various components that include control surfaces. Such control surfaces may modify an aspect of travel of various systems in response to movement of these control surfaces. These control surfaces generally have a neutral position, at which load on the control surface is minimized, and various other positions, which are subject to an increased load in order to modify the travel of associated systems. This varying load on the control system defines a load profile.

Many commonly available actuators are not designed to efficiently manage this load profile. Some common actuators have their highest mechanical advantage at or around a neutral position of an associated control surface. When the control surface is loaded at the extremes of its envelope, typical systems experience low mechanical advantage. The low mechanical advantage necessitates higher overall actuator power to achieve and maintain a desired control surface orientation. In other words, common implementations require an oversized (e.g., higher power) actuator. In this regard, a higher power actuator results in a heavier component, increased power requirements and/or increased power consumption (e.g. higher current draw), heavier support components (larger transistors such as metal-oxide semiconductor field-effect transistors (MOSFETs)), and the like.

Other commonly available actuators do not provide dramatic variance in mechanical advantage, but may result in a less efficient system than one that leverages mechanical advantage more favorably. Similarly, such an approach results in a heavier component, increased power requirements, heavier support components, and the like.

Accordingly, it would be beneficial to develop actuation systems that leverage mechanical advantage to peak at the highest-loaded portions of a control system envelope.

SUMMARY

The foregoing needs are met, to a great extent, by the disclosure, wherein in one aspect a multi-bar linkage is disclosed.

In accordance with one aspect a system includes a three-way linkage joint and a control link having a control ground end and a control joint end. The control ground end is rotatably coupled to a fixed portion of a controlled system and the control joint end is rotatably coupled to the three-way linkage joint. The system also includes a drag link having a drag drive end and a drag joint end. The drag joint end is rotatably coupled to the three-way linkage joint. The system also includes a drive link having a drive drag end and a drive actuator end. The drive drag end is rotatably coupled to the drag drive end. The drive actuator end is operatively coupled to an actuator. The system also includes an output link having an output surface end and an output joint end. The output joint end is rotatably coupled to the three-way linkage joint. The system also includes a surface link having a surface output end and a surface control end. The surface output end is rotatably coupled to the output surface end and the surface control end is operatively coupled to a movable control surface of the controlled system.

In accordance with one aspect a method includes driving a multi-bar linkage that is mechanically coupled to a fixed portion of the controlled system, the movable control surface, and an actuator. A control link couples the multi-bar linkage to the fixed portion and a drive link couples the multi-bar linkage to the actuator. The surface link couples the multi-bar linkage to the movable control surface and a drag link couples the drive link to the control link. An output link couples the surface link to the control link.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1A:
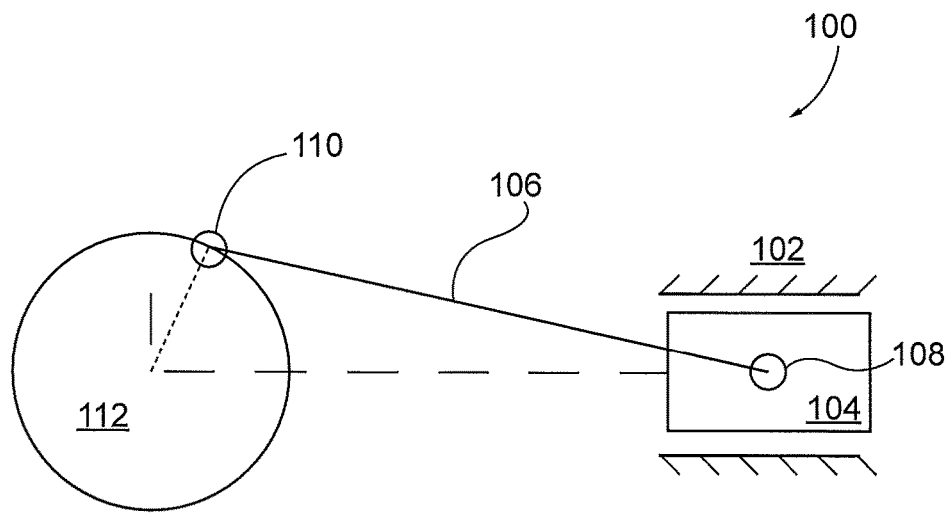
FIGS. 1A, 1B, and 1C illustrate various actuators and linkages for moving control surfaces.

The disclosure herein concerns a multi-bar linkage that results in a concave curve of mechanical advantage against deflection in a control surface, or similar mechanical advantage such that mechanical advantage is lowest at or near neutral positions and highest at the extremes of a control surface's operating envelope. In other words, a multi-bar linkage that results in a mechanical advantage that is lowest at lower load positions and a mechanical advantage that is highest at higher load positions.

Aerodynamic systems (such as aerial vehicles including aircraft) and hydrodynamic systems (such as for marine vehicles including ships and submarines) are controlled at least in part by control surfaces, movable parts which change the fluid dynamics about the system when reoriented, in turn changing the travel of the aerodynamic/hydrodynamic system through the fluid medium. When a control surface is in a neutral position (e.g., zero degrees to a wing chord or otherwise oriented to minimize drag while it passes through a fluid medium), aerodynamic load on the control surface is minimized. As the angle to the neutral position increases (in terms of absolute value, whether positive or negative) the aerodynamic load will increase, requiring greater force or torque to continue increasing angle. To accommodate wide envelopes for control surfaces, many control surfaces are driven through mechanical linkages instead of being directly driven with an actuator attached immediately to the control surface. Different mechanical linkages will have different characteristics including mechanical advantage.

A "link" herein can represent any mechanical component, and can include rods, bars, ties, cylinders, shafts, tubes, arms, and other structural members. Links may be linear or non-linear (e.g., jogged, curved). Links can have symmetrical or asymmetrical profiles or cross-sections. Links can be strengthened or reinforced at certain points (e.g., portions under increased shear forces or other loads). Links can be formed of various materials, including but not limited to metals such as aluminum, titanium, steel, or the like, plastics, carbon fiber, et cetera. Links can be joined by various joints which can be integral to the links or physically distinct components. In aspects links can have rod end bearings at one or more ends. In aspects links can have clevises at one or more ends. Additional or alternative bearings, pins, joints, fasteners, or other hardware can be utilized to join one or more links herein to other links or other components. Joints and junctions between components herein can be kept to tolerances which allow free motion but minimize backlash or loss of response. By minimizing "play" between joints, input from an actuator and output to a control surface can remain closely correlated. In aspects, a joint used herein can restrict motion to one rotational degree of freedom. In aspects, a joint used herein can permit two or more rotational degrees of freedom. Combinations of different joint types between different links can be utilized in the same linkage and/or system.

Various systems integrating aspects of the disclosure can be vehicles or portions thereof. In an aspect, vehicles include aircraft or flying systems. In an aspect, vehicles include marine craft including surface and submersible craft. In an aspect, vehicles include ground systems which utilize aerodynamic surfaces for control, steerage or braking. In an aspect, vehicles can include drones or other remote/unmanned systems. Various systems integrating aspects of the disclosure can be for any movable structure or component including robots, doors, windows, and the like. However, for brevity of description, the disclosure will reference control surface. Nevertheless, the disclosure is applicable to numerous other implementations.

FIGS. 1A, 1B, 1C, and 1D illustrate various typical linkage designs distinct from the disclosed multi-bar linkage. In particular, FIG. 1A shows an actuation system 100 utilizing a linear to rotary (or rotary-to-linear) actuator output configuration to control a control surface 104 of a controlled system 102. In system 100, a single link 106 is coupled to an actuator pivot 110 connected to a rotary actuator 112. Opposite the rotary actuator 112, the link 106 is coupled to a control surface pivot 108 on the control surface 104. The angular position of the rotary actuator 112 will dictate the location of the control surface 104 in relation to the controlled system 102. An alternative aspect can reverse the arrangement of system 100, whereby the actuator provides a linear input (e.g., force applied via element 104) to cause angular displacement of a rotary control surface (e.g., element 112).

Figure 1B:
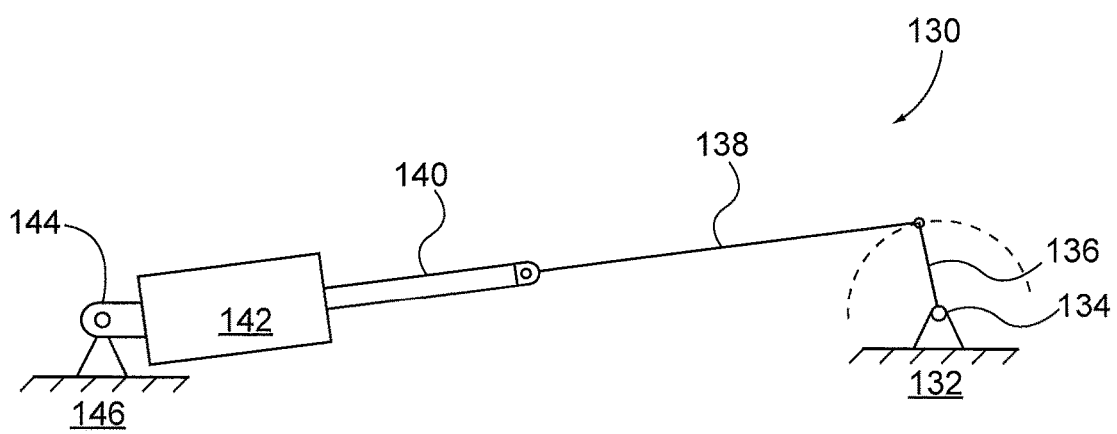

FIG. 1B shows an alternative actuation system 130 utilizing a linear-to-rotary actuator output configuration to control a control surface 132 of a controlled system 146. An actuator 142 connects to the controlled system 146 through a pivot 144. The actuator 142 is coupled with housing 140 which at least partially houses output link 138. Housing 140 includes a nut or other threaded portion, which can be integral or retained by a spline or other feature mated with output link 138. The output link 140 is extended or retracted through rotation provided by actuator 142. The output link 138 is connected to a surface link 136 that is connected to a control surface 132 using a pivot 134. Extension or retraction of output link 138 with respect to housing 140 causes rotation of the surface link 136, thereby influencing the control surface 132.

Figure 1C:
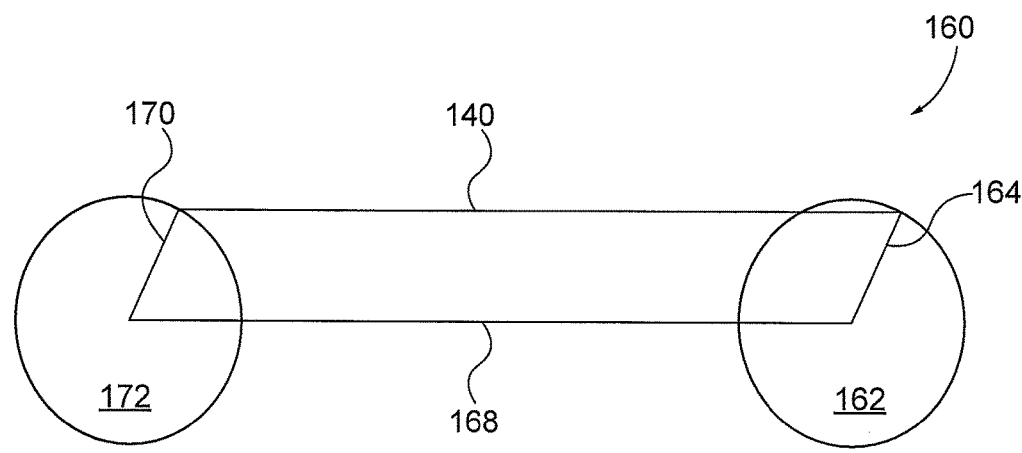

FIG. 1C shows an alternative, double-rocker actuation system 160 providing rotary-to-rotary output configuration for control. Actuator 172 acts on one or more of links 164, 140, and/or 170 to influence the position of control surface 162 and/or link 164. As with systems 100 and 130, system 160 can also reverse this arrangement to allow driving of the system opposite that provided above if the actuator element or location is changed (e.g., actuator is element 162). System 160, unlike systems 100 and 130, provides a one-to-one mechanical advantage. Establishing this one-to-one mechanical advantage is challenging and frequently requires a larger "footprint" for the control linkage than can be implemented within, for example, aerodynamic structures.

Figure 1D:
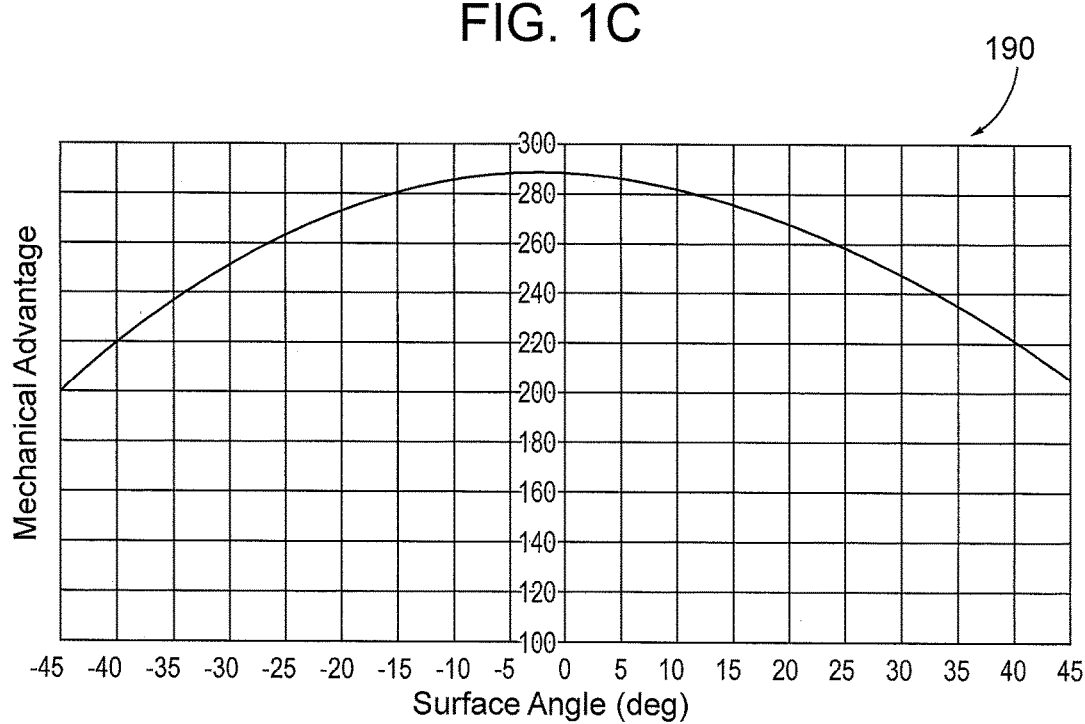
FIG. 1D illustrates an example curve depicting combined mechanical advantage for arrangements such as those depicted in FIGS. 1A and 1B.

Systems 100 and 130 do not provide a one-to-one mechanical advantage. As can be appreciated in FIGS. 1A and 1B, the changing angles of elements through ranges of motion also provide different mechanical advantage at different orientations. FIG. 1D illustrates an example graph 190 of mechanical advantage plotted against system position for linkages such as those of FIGS. 1A and 1B. These linkages produce an undesirable mechanical advantage because the mechanical advantage is typically inverse to the aerodynamic load. At a neutral position or position of low deflection (e.g. 0°), mechanical advantage (or gain) is high, meaning changes to the control surface can be accomplished with lower actuator output (given the low resistance to change and high mechanical advantage). On the other hand, at positions of high deflection (e.g. 45°), mechanical advantage is low when aerodynamic load (opposing forces or torque) are high. Mechanical advantage also corresponds to torque, inverse to speed, two parameters which are important to control throughout a surface's range of motion. In an example of problems posed by this arrangement, it is understood that speed will be high when mechanical advantage is low. Because this occurs at high deflection, speed may result in excessive impact contributing to wear and tear on the components interacting with the system. To provide function through the envelope of the control surface when faced with a convex curve as illustrated in FIG. 1D, larger motors and supporting electrical components are required. In comparison to more efficient systems of the disclosure, those having convex curves as illustrated in FIG. 1D are heavier, less aerodynamic, have a larger footprint, and more expensive. While some control schemes may benefit from this arrangement—where significant responsiveness is needed near the "zero" position and more sluggish response is acceptable at the edges of the envelope—it can lead to inefficiencies or other undesired control effects.

Figure 2A:
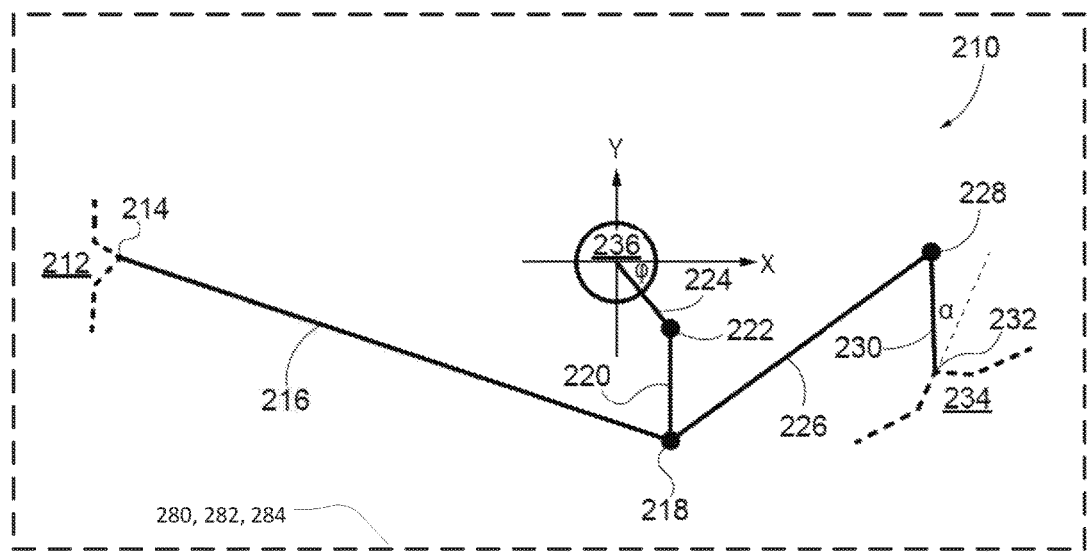
FIG. 2A illustrates an example aspect of a multi-bar linkage and actuator disclosed herein.

FIG. 2A illustrates a line drawing of a multi-bar linkage actuation system 210 in accordance with the disclosure. The multi-bar linkage actuation system 210 may be implemented in a controlled system having a fixed portion 212 and a control surface 234. The fixed portion 212 may be a hard point or other static connection point, and may be a part of the actuator, integrated into the actuator, or attached to other structure. A control link 216 is movably coupled with the fixed portion 212 using a control joint 214. In one aspect, the control joint 214 may be a pivot point about which the control link 216 pivots. The control link 216 may meet with two other moving elements—a drag link 220 and an output link 226—at a three-way linkage joint 218. However, the three-way linkage joint 218 may likewise be implemented with joints separated by spacers or other arrangements. The control joint 214 may be a fixed or static joint in relation other structure, rotating or facilitating rotating but not translating in any direction.

In one aspect, the three-way linkage joint 218 is a pivot point about which the control link 216, the drag link 220, and the output link 226 pivot with respect to one another. To drive the multi-bar linkage, the drag link 220 is coupled with a drive link 224 at a drive joint 222, and the drive link 224 is in turn coupled to a rotary actuator 236. The output link 226 movably couples to a surface link 230 at an output joint 228, and the surface link 230 movably connects to the control surface 234 at surface joint 232. While 234 is described as the "control surface 234," this element may be other structure (e.g., not a "control surface") without departing from the scope or spirit of the innovation.

Figure 2B:
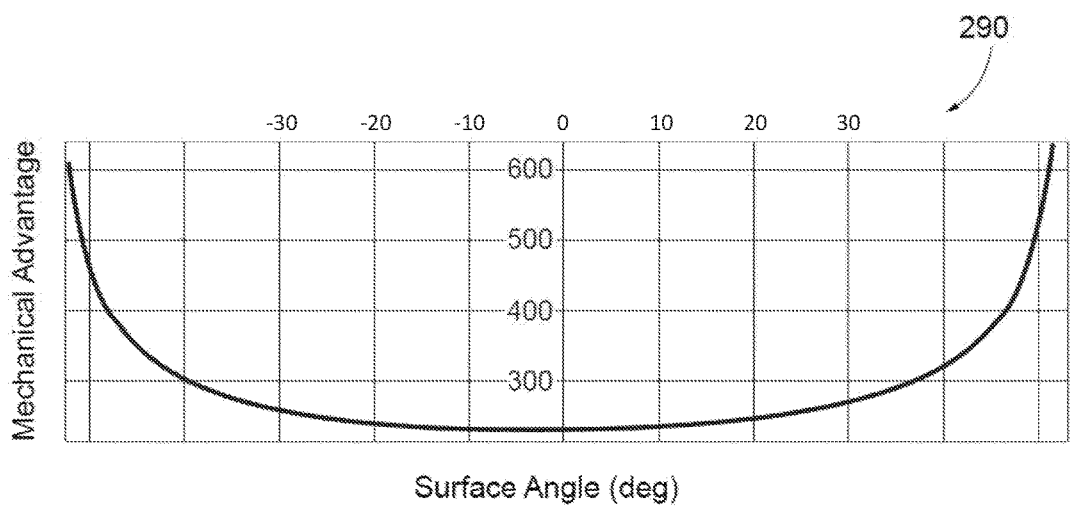
FIG. 2B illustrates an example curve depicting combined mechanical advantage for arrangements such as those depicted in FIG. 2A.

In operation, the actuator 236 may drive the drive link 224 which may drag the drag link 220, in turn driving the output link 226 to rotate the surface link 230 about the surface joint 232. The surface joint 232 may be a fixed or static joint in relation other structure, rotating or facilitating rotating but not translating in any direction. As the actuator 236 approaches a higher angle, its mechanical advantage increases, producing a concave mechanical advantage curve (e.g., higher torque and lower speed at higher angles as shown in graph 290 of FIG. 2B). The increased torque allows the control surface 234 to overcome resistance (e.g., aerodynamic load) while deflecting or displacing, and the decreased speed prevents the "slamming" of parts at the extremes of envelope, reducing risk of damage and wear. Reduced speeds also prevent overcompensation (loss of control due to, e.g., increased load, increased changes to travel of the associated system) thereby reducing the risk of loss of control at the edges of the system envelope or damage from excess loads.

The actuator 236 may be any type of actuator that provides a rotational output. In some aspects, the actuator may be an electrical mechanical actuator. In some aspects the actuator 236 may be an electrically driven motor. In some aspects the actuator 236 may be a hydraulically driven motor. In some aspects the actuator 236 may be an electrically driven motor having reduction gearing.

As discussed, the surface joint 232 may connect to a control surface. In this regard, aspects herein provide that the multi-bar linkage actuation system 210 may be configured to actuate a flight surface for an aircraft 280 including one of flaps, a spoiler, a rudder, a ruddervator, an aileron, an elevator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, an aileron trim, and the like. In alternative aspects, a control surface may be a hydrodynamic or marine control surface such as a rudder on a ship 284, a stabilizer on a ship 284, an elevator on a submarine, and the like. In still further aspects, a control surface need not be a surface relating to travel of an associated system, but another functional surface aided by power actuation. For example, doors or windows which experience resistance in opening, closing, or other movement (e.g., weight, pressure differential, debris or obstacles blocking opening in emergency situation), or other systems or subsystems which experience resistance or loads during deployment or redeployment (e.g., landing gear, in-flight fuel probes, auxiliary power unit (APU) doors, weapon systems, thrust reversers, valve actuation systems, wing position systems (variable sweep wings), and the like) that may be opened, closed, or assisted by the multi-bar linkage actuation system 210 or others herein. In this regard, aspects herein provide that the multi-bar linkage actuation system 210 may be configured to actuate various robotic arm manipulators, robotic systems 282, or the like.

Linkages such as that of FIG. 2A provide significant weight savings and provide more efficient actuation compared to alternatives such as those shown in FIGS. 1A, 1B, and 1C. This also allows integration into a larger number of aerodynamic systems.

System 210 can be defined in terms of a coordinate system having x and y coordinates (x,y). To provide coordinate values for some portions of system 210, let:

the control joint 214 have coordinates (a,b);
the control link 216 have length k;
the three-way linkage joint 218 have coordinates $(x_2, y_2)$;
the drag link 220 have length m;
the drive joint 222 have coordinates $(x_1, y_1)$;
the drive link 224 have length r, the actuator 236 output angle be $\varphi$;
the output link 226 have length l;
the output joint 228 have coordinates $(x_3, y_3)$;
the surface link 230 have length R;
the surface joint 232 have coordinates (c,d); and
the control surface angle be $\alpha$.

Based on these definitions, the position of elements in system 210 will be defined by the following equations:

$$x_1 = r\cos\varphi \quad \text{Equation 1}$$

$$y_1 = r\sin\varphi \quad \text{Equation 2}$$

$$(x_2 - x_1)^2 + (y_2 - y_1)^2 = m^2 \quad \text{Equation 3}$$

$$(x_2 - x_3)^2 + (y_2 - y_3)^2 = l^2 \quad \text{Equation 4}$$

$$(x_3 - c)^2 + (y_3 - d)^2 = R^2 \quad \text{Equation 5}$$

$$(x_2 - a)^2 + (y_2 - b)^2 = k^2 \quad \text{Equation 6}$$

$$\alpha = a\sin\frac{x_3 - c}{R} \quad \text{Equation 7}$$

Based on the actuator output angle $\varphi$ and the surface rotating angle $\alpha$, the linkage mechanical advantage can be defined as:

$$MA = \frac{\Delta\varphi}{\Delta\alpha} \quad \text{Equation 8}$$

Using the design of system 210 and the mathematical relationships described, the mechanical advantage will vary from more than one to infinity, with high torque and speed approaching zero as mechanical advantage goes to infinity. Mechanical advantage is lowest when the drag link 220 and the drive link 224 form a right angle. This is because the actuator 236 has the longest moment arm in this configuration. From a back-driven perspective, the actuator is under the most torque when the drag link 220 and the drive link 224 are at a right angle. Mechanical advantage is highest when the drag link 220, the drive link 224, the control link 216, and the output link 226 are aligned (and, in the aspect of system 210, define a line). In this configuration, there is no moment arm for the actuator 236, and no load for the actuator 236 from a back-driven perspective. When the control link 216 and the output link 226 are in line, there is no load on the drag link 220, and no load passed to the actuator 236. If linkage length and geometries are properly set for a given application, this provides the disclosed concave curve of mechanical advantage or torque against envelope position for a control surface.

Ends of links in FIGS. 2 and 3 can be referenced herein in terms of the interfacing elements. For example, a control ground end can be the end of the control link 216 proximate or connected to the control joint 214; a control joint end can be the end of the control link 216 proximate or connected to the three-way linkage joint 218; a drag drive end can be the end of the drag link 220 proximate or connected to the drive joint 222; a drag joint end can be the end of the drag link 220 proximate or connected to the three-way linkage joint 218; a drive drag end can be the end of the drive link 224 proximate or connected to the drive joint 222; a drive actuator end can be the end of the drive link 224 proximate or connected to the actuator 236; an output surface end can be the end of the output link 226 proximate or connected to the output joint 228; an output joint end can be the end of the output link 226 proximate or connected to the three-way linkage joint 218; a surface output end can be the end of the surface link 230 proximate or connected to the output joint 228; and a surface control end can be the end of the surface link 230 proximate or connected to the surface joint 232. While "ends" are described herein in the interest of brevity, it is understood that parts, portions or other subcomponents of a link, whether symmetrical or asymmetrical, or whether straight, curved, or jogged/stepped, can be alternatively used in place of "ends" or joint-proximate or joint-distal portions without departing from the scope or spirit of the innovation.

Figure 3A:
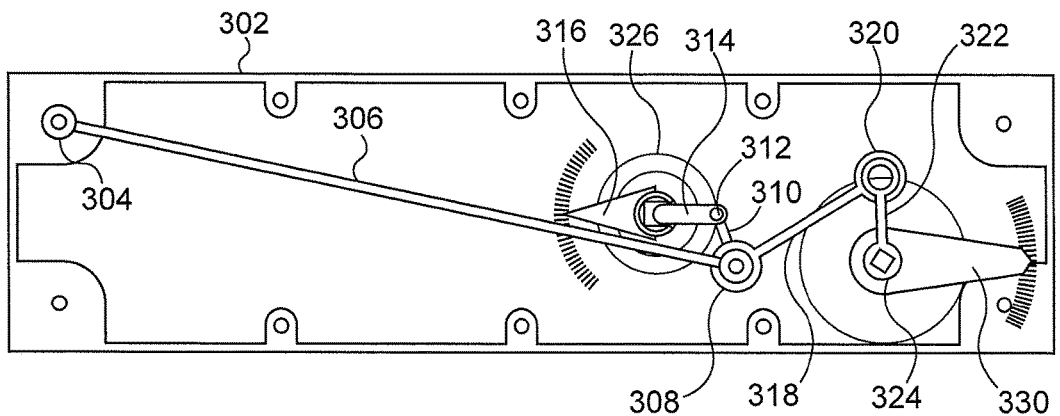
FIGS. 3A, 3B, and 3C illustrate further aspects of a multi-bar linkage and actuator disclosed herein.
Figure 3B:
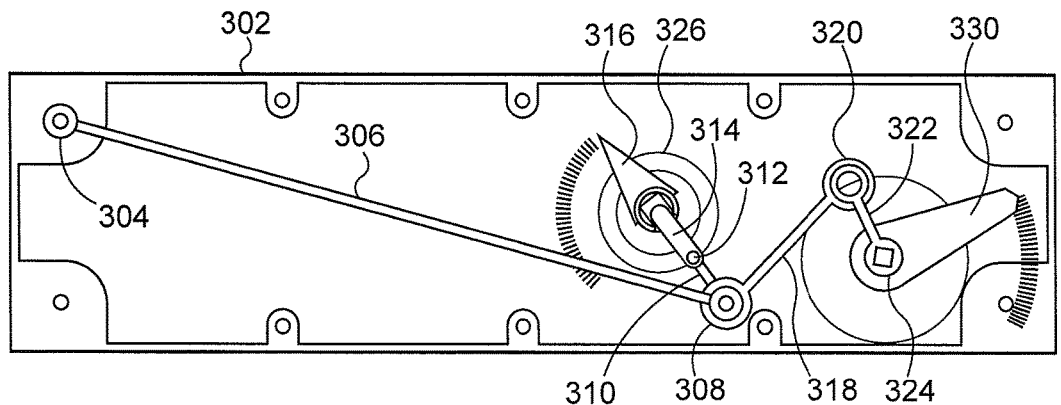
Figure 3C:
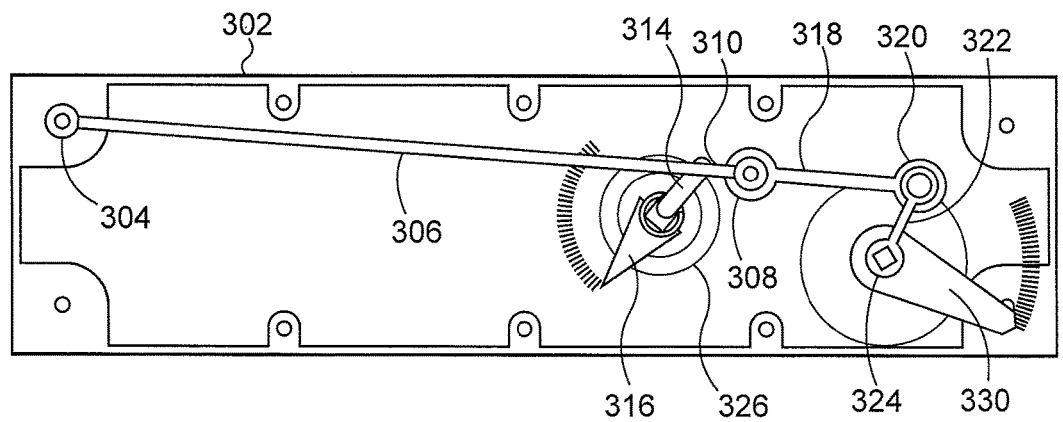

FIGS. 3A, 3B, and 3C show an example implementation of a multi-bar linkage actuation module 300 with linkage elements in different orientations as disclosed herein. The module 300 may be a self-contained, drop-in actuation system for installation in a controlled system. The module 300 may include a housing 302. A control joint 304 may be attached to a fixed portion of the housing 302. In an alternative aspect, the control joint 304 can be attached to another fixed point within a system in which the module 300 is integrated. The control joint 304 may be a fixed or static joint in relation other structure, rotating or facilitating rotating but not translating in any direction.

A control link 306 may be movably attached to the control joint 304. The control link 306 may meet other elements at three-way linkage joint 308 or similar structure. A drag link 310 also movably connects to the control link 306. A drive link 314 connects to the drag link at a drag joint 312, and connects to an actuator 326 at a drive joint 316. In an aspect, one or more links or other components can be a portion of actuator 326.

An output link 318 is also movably connected to the three-way linkage joint 308. The output link 318 meets the surface link 322 at an output joint 320, and the surface link 322 connects to the control surface at the surface joint 324. The surface joint 324 may be a fixed or static joint in relation other structure, rotating or facilitating rotating but not translating in any direction.

The surface joint 324 can connect to, e.g., structure 330. The structure 330 can rotate based on the orientation of the surface joint 324, which is a function of the position and orientation of the surface link 322 and elements which directly or indirectly influence the position and orientation of the surface link 322. Thus, in, e.g., FIG. 3A, the structure 330 is shown at one angle, while in, e.g., FIG. 3C, the structure is shown at other angles. In all of these figures, the angular and spatial relationship between the surface link 322 and the structure 330 remains the same.

In certain aspects, the mechanical advantage is lowest when the drag link 310 and the drive link 314 form a right angle as shown in FIG. 3A. In certain aspects, the mechanical advantage is highest when the drag link 310 and the drive link 314 are aligned as shown in FIG. 3B. In certain aspects, the mechanical advantage is highest when the control link 306 and the output link 318 are aligned as shown in FIG. 3C.

While module 300 provides a particularly illustrated arrangement, it is understood that various alternatives can be practiced without departing from the scope or spirit of the innovation. For example, while the housing 302 is depicted as having a six-sided polygonal cross-section, the housing may include any number of sides or edges which may be straight or curved. One or more of the links depicted need not be substantially linear, and may include curved, stepped, offset, have offset portions, or the like.

Further, while the module 300 shows all elements enclosed in the housing 302, in alternative aspects the disclosed multi-bar linkage can be implemented without a housing 302, or in a manner that allows elements to extend beyond a profile of the housing 302. For example, using apertures or gaps in the housing 302, one or more links may extend beyond the perimeter of the housing 302 for at least a portion of its range of motion.

In further aspects, the module 300 can include or be operatively coupled with a control system for controlling at least the actuator 236 or the actuator 326. A control system can include circuitry, logic, a processor, a microprocessor, a controller, and the like for driving the actuator 326 at particular speed or torque, or until a control surface linked by the surface joint 324 is driven to a desired position or orientation. In an aspect, the control system can perform a transform on one or more of the position or speed of the actuator 326, the control surface, or other positions to provide desired control through the envelope of the control surface, compensating for changing mechanical advantage, speed, torque, et cetera. One or more different control schemes or ratios can be selected and utilized based on the transform and input processing.

In some aspects, the control system may implement an adjustable-speed drive or variable-speed drive that may include adjusting an operating speed of a mechanical load. An electrical adjustable-speed drive may include an electric motor and a speed controller or power converter plus auxiliary devices and equipment. In some aspects, the control system may include an Intelligent Motor Controller that may use a microprocessor to control power electronic devices used for motor control. The Intelligent Motor Controller may monitor the load on a motor and accordingly match motor torque to motor load.

The control system may further include sensors. The sensors may sense various aspects of the multi-bar linkage actuation system 210, the actuator 236, the module 300, the actuator 326, the various links, and the like. The sensors sensing a position, orientation, speed, displacement, acceleration, and the like of any of the above noted components. The sensors may include a capacitive transducer, a capacitive displacement sensor, an eddy-current sensor, an ultrasonic sensor, a grating sensor, a Hall effect sensor, an inductive non-contact position sensor, a Laser Doppler vibrometer, a linear variable differential transformer, a multi-axis displacement transducer, a photodiode array, a piezo-electric transducer (piezo-electric), a potentiometer, a proximity sensor, a rotary encoder, a linear encoder, a string potentiometer, and the like.

In aspects, a control surface or controlled system can be designed in accordance with the mechanical advantage presented by the disclosed multi-bar linkage. For example, the geometry of a control surface in an aircraft can be particularly arranged and scaled to accord with the mechanical advantage provided by the disclosed multi-bar linkage. In one aspect, the disclosure includes a process that may be implemented to maximize one or more of equations 1-8 for designing and implementing a module 300 as disclosed in a desired system.

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system configured to provide a concave curve of torque against output position, comprising:
    a three-way linkage joint;
    a control link having a control ground end and a control joint end, wherein the control ground end is rotatably coupled to a fixed portion of a controlled system, and wherein the control joint end is rotatably coupled to the three-way linkage joint;
    a drag link having a drag drive end and a drag joint end, wherein the drag joint end is rotatably coupled to the three-way linkage joint;
    a drive link having a drive drag end and a drive actuator end, wherein the drive drag end is rotatably coupled to the drag drive end of the drag link, and wherein the drive actuator end is operatively coupled to an actuator;
    an output link having an output surface end and an output joint end, wherein the output joint end is rotatably coupled to the three-way linkage joint; and
    a surface link having a surface output end and a surface control end, wherein the surface output end is rotatably coupled to the output surface end, and wherein the surface control end is operatively coupled to a movable surface of the controlled system,
    wherein the three-way linkage joint is rotatably coupled to the control link, the drag link, and the output link.

2. The system of claim 1, further comprising the controlled system, wherein the controlled system is a portion of an aircraft.

3. The system of claim 1, further comprising the controlled system, wherein the controlled system is a portion of a robot.

4. The system of claim 1, further comprising the controlled system, wherein the controlled system is a portion of a marine vessel.

5. The system of claim 1, further comprising the controlled system, wherein the controlled system is a vehicle.

6. The system of claim 1, further comprising the movable surface and the movable surface comprises a movable control surface.

7. The system of claim 1, further comprising the actuator.

8. The system of claim 7, wherein the actuator is a rotary actuator.

9. The system of claim 1, further comprising an actuator controller configured to command and control actuation of the actuator.

10. The system of claim 9, wherein the actuator controller calculates a transform of an actuator speed to determine a displacement of the movable surface relative to an input.

11. The system of claim 1, wherein:
    a mechanical advantage is defined as a ratio of a change in position of the actuator to a change in position of the movable surface; and
    the mechanical advantage of the system is minimized when a longitudinal axis of the drive link is perpendicular to a longitudinal axis of the drag link.

12. The system of claim 1, wherein:
    a mechanical advantage is defined as a ratio of a change in position of the actuator to a change in position of the movable surface; and
    the mechanical advantage of the system is maximized when longitudinal axes of the control link, the drag link, the drive link, the output link, and the surface link are substantially aligned.

13. The system of claim 1, wherein a portion of one or more of the control link, the drag link, the drive link, the output link, or the surface link extends beyond an edge of a housing during a portion of a cycle.

14. The system of claim 1, wherein one or more of the three-way linkage joint, the control joint end, the drag joint end, or the output joint end include a clevis-pin connection.

15. The system of claim 1, wherein one or more of the control link, the drag link, the drive link, the output link, or the surface link includes a jogged portion.

16. The system of claim 1, wherein one or more of the control link, the drag link, the drive link, the output link, or the surface link includes a curved portion.

17. The system of claim 1, wherein the three-way linkage joint couples the control link, the drag link, and the output link at a common connection.

18. The system of claim 1, wherein the controlled system is a portion of an aircraft.

19. The system of claim 1, further comprising a controller configured for commanding action of the actuator.

* * * * *